(12) United States Patent
Deng-Peng

(10) Patent No.: US 7,514,899 B2
(45) Date of Patent: Apr. 7, 2009

(54) METHOD AND APPARATUS FOR OPTICAL WIRELESS CHARGING

(75) Inventor: Chen Deng-Peng, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 382 days.

(21) Appl. No.: 11/283,304

(22) Filed: Nov. 18, 2005

(65) Prior Publication Data
US 2007/0114967 A1 May 24, 2007

(51) Int. Cl.
H01M 10/44 (2006.01)
H01M 10/46 (2006.01)
H02J 7/00 (2006.01)

(52) U.S. Cl. .................... 320/101; 136/291
(58) Field of Classification Search ............ 320/101; 136/291
See application file for complete search history.

(56) References Cited

U.S. PATENT DOCUMENTS

| 6,650,085 | B2 | 11/2003 | Lau et al. | |
|---|---|---|---|---|
| 6,906,495 | B2 | 6/2005 | Cheng et al. | |
| 2003/3094921 | | 5/2003 | Lau et al. | |
| 2003/0210106 | A1 | 11/2003 | Cheng et al. | |
| 2003/0231001 | A1 | 12/2003 | Bruning | |
| 2004/0266367 | A1* | 12/2004 | Tuominen et al. | 455/91 |
| 2005/0116683 | A1 | 6/2005 | Cheng et al. | |
| 2006/0164031 | A1* | 7/2006 | Leem | 320/101 |
| 2007/0069684 | A1* | 3/2007 | Ramsden | 320/101 |

FOREIGN PATENT DOCUMENTS

| CA | 2409465 | 9/2004 |
|---|---|---|
| GB | 2388715 A | 11/2003 |
| GB | 2388716 A | 11/2003 |
| GB | 2392024 A | 2/2004 |
| GB | 2393860 A | 4/2004 |
| GB | 2394843 A | 5/2004 |
| GB | 2398176 A | 8/2004 |
| GB | 2399229 A | 8/2004 |
| GB | 2399230 A | 8/2004 |
| GB | 2399225 A | 9/2004 |
| GB | 2399226 A | 9/2004 |
| GB | 2399227 A | 9/2004 |
| GB | 2399228 A | 9/2004 |
| GB | 2414120 A | 11/2005 |
| GB | 2414121 A | 11/2005 |
| WO | WO2004/030176 A2 | 9/2003 |
| WO | WO03/096361 A1 | 11/2003 |

(Continued)

OTHER PUBLICATIONS

Fox, B., One Charging Pad Could Power up all Gadgets, Newscientist.com, Jan. 22, 2005.

(Continued)

Primary Examiner—Edward Tso
Assistant Examiner—Alexis Boateng

(57) ABSTRACT

A portable electronic device is recharged by generating light from a light source of a wireless optical charger, converting the light from the charger into an electrical signal using a photovoltaic cell of the portable electronic device and charging the portable electronic device using the electrical signal. The wireless optical charger may include a proximity sensor that switches on the light source when a portable electronic device is close to the light source.

22 Claims, 5 Drawing Sheets

FOREIGN PATENT DOCUMENTS

| | | |
|---|---|---|
| WO | WO03/105311 A1 | 12/2003 |
| WO | WO2004/055654 A2 | 12/2003 |
| WO | WO2004/038887 A1 | 5/2004 |
| WO | WO2004/038888 A2 | 5/2004 |
| WO | WO2005/024865 A2 | 3/2005 |
| WO | WO2005/109597 A1 | 11/2005 |
| WO | WO2005/109598 A1 | 11/2005 |

OTHER PUBLICATIONS

Peterson, A. et al., Harness solar Power with Smart power-Conversion Techniques, EDN Magazine, Feb. 4, 1999, pp. 119-124.

* cited by examiner

METHOD AND APPARATUS FOR OPTICAL WIRELESS CHARGING

FIELD

This invention relates generally to the field of portable electronic devices. More particularly, this invention relates to a battery charger for portable electronic devices.

BACKGROUND

Portable electronic devices, such as mobile cellular telephones, personal digital assistants (PDA's), digital cameras, portable audio devices (MP3 players, CD players, radios etc.) and portable video devices (recorders and players), are powered by electrical batteries. Large batteries are prohibitively heavy and/or bulky, so battery capacities are often around 1 amp hour (Ah), which provides an acceptable usage time for devices with low power consumption. Often these batteries are rechargeable.

Removeable batteries may be of standard size. This allows the batteries to be removed and placed in an external battery charger. However, many devices use custom sized batteries that are not removed from the electronic device for charging. For these devices, dedicated chargers are used. However, there is very little standardization of chargers, and consequently different brands of portable device and different types of portable device have different charges. A user may therefore be required to have a range of different chargers, all competing for space and electrical power outlets. The problem is exacerbated if the user needs to charge the devices at multiple locations, for example at the home and at the office, or if the user travels often.

One approach to mitigate this problem is the standardization of chargers. For example, a universal charger might be fitted with detachable charging plugs to fit a number of portable devices. The source of power for the charger might be a power line, a computer USB port, a solar cell, a fuel cell or even a mechanically turned dynamo. This approach still results in a duplication of components (the charging plugs).

A further approach, which eliminates the use of charging plugs, is the use of an inductive coupling (magnetic field interaction) to provide a wireless coupling to the portable device. In one approach, a charging pad contains a number of electrical coils that carry an electrical current. The portable device also contains an electrical coil. When the portable device is place on the charging pad, an electrical current is induced in the coil of the portable device; this current is used to charge the battery.

In a second approach, inductive charging is combined with a solar cell. The solar cell receives ambient light and converts it to electricity to slowly charge a battery in the charger. An inductive coupling is used to transfer charge to the portable device when it is placed close to the charger.

While an inductive charger has advantages, one disadvantage is that the electromagnetic field may interfere with other electronic devices, of magnetically recorded media (such as credit cards or video tapes).

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
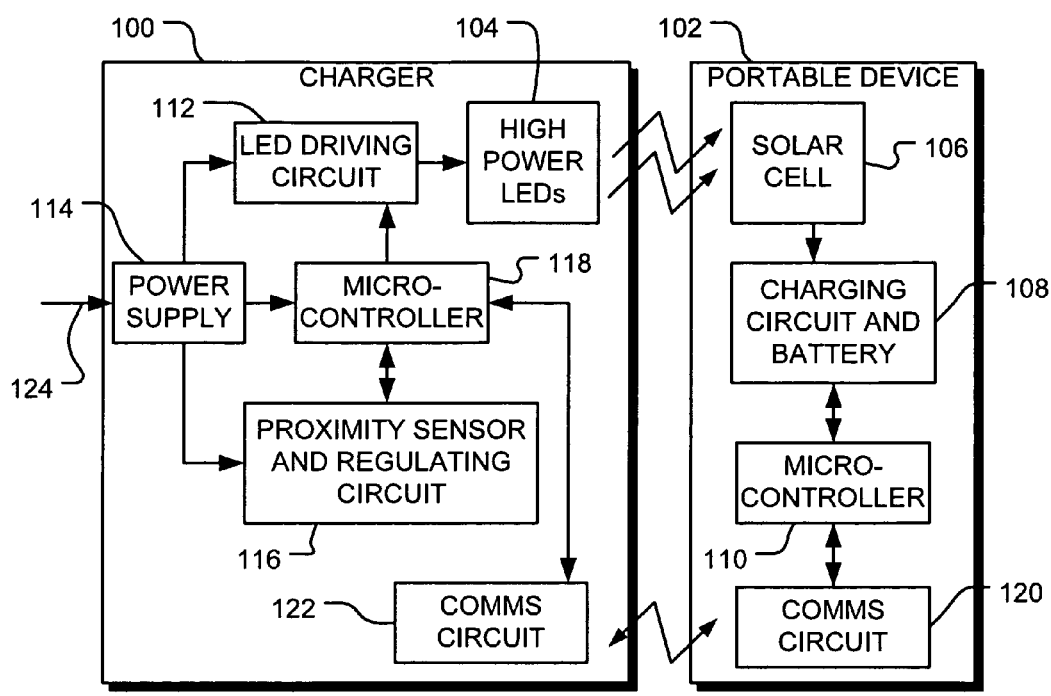
FIG. 1 is a block diagram of wireless optical charger and a portable electronic device consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a method and apparatus for wireless optical charging of a portable electronic device. Examples of portable electronic devices include a mobile communication device (such as radio, mobile telephone or walkie-talkie), a portable computing device (such as a personal digital assistant or palmtop or laptop computer), a portable entertainment device (such as a music player, game console or toy), a personal care item (such as a toothbrush, shaver, hair curler, hair rollers), a portable imaging device (such as a video recorder or camera), a consumer device (such as a flashlight, clock or fan) or a battery or battery-pack for insertion into any of the above.

One embodiment of the invention relates to a system for transferring electrical charge to a portable device. The system includes a first conversion means for converting a first electrical signal into an optical signal and a second conversion means for receiving the optical signal and converting it to a second electrical signal for charging the portable device. The first conversion means may be an array of light emitting diodes, or some other light source, mounted in charger, while the second means may be a photovoltaic cell mounted on the portable device. The first electrical signal may be derived from an A.C. power outlet, for example, or some other source.

FIG. 1 is a block diagram of wireless charger 100 and portable electronic device 102 consistent with certain embodiments of the invention. Referring to FIG. 1, the charger 100 includes a high power light source 104, such as one or more high power light emitting diodes (LED's), which is operable to emit high intensity light that falls onto one or more photovoltaic cells 106 of the portable device 102. In the following description, the light source will generally be referred to as comprising one or more LED's, but it is to be understood that other light sources may be used. The LED's may be infrared LED's so as to increase eye safety. For example, the LED's may produce light with wavelengths in the range 700 nm-1000 nm. The photovoltaic cell 106 (also called a solar cell, a photo-detector or an optical detector) converts at least a portion of the light into an electrical signal that is coupled to a charging circuit and battery (or other charge storage device) 108. The battery may be one or more voltaic cells. A variety of suitable charging circuits are well known to those of ordinary skill in the art. The photovoltaic cell 106 may be positioned in the casing of the portable device 102. The sensitivity of the photovoltaic cell 106 may be chosen to match the wavelengths of the light emitted from the light source 104. In one embodiment, the photovoltaic cells are c-Si photovoltaic cells, which have peak sensitivity for light with wavelengths around 950 nm. Optionally, a microcontroller 110 of the portable device is used to control the charging circuit 108.

The high power LED's 104 are driven by an LED driving circuit 112 that, in turn, is powered from power supply 114. The power supply may be derived from an external power source, such as a power line, or other source (such as a battery with a slow solar charger or a vehicle DC power outlet), and may supply direct or alternating current. Driving circuits for large numbers of LED's are well known, both for rectified DC or AC power line power supplies.

In one embodiment, the charger 100 includes a proximity sensor and associated regulating circuit 116. The proximity sensor is used to detect the proximity or removal of a portable device from the charger. When the portable device is in the proximity of the charger 100, the light source is turned on. When the portable device is removed, the light source is turned off. This reduces the amount of power consumed by the charger and also increases eye safety. The proximity sensor may be a reflective sensor, with an emitter and a receiver. In one embodiment, the sensor's emitter is driven by a modulated signal and its detector regulation circuit includes a band-pass filter in order to reduce the influence of light from the high power LED's of the charging light source. The LED's may have a constant intensity or they may be modulated at a different rate from the sensor. For example, the LED's may be modulated at a much lower frequency. A microcontroller 118, responsive to the proximity sensor and regulating circuit 116 may be used to control the LED driving circuit 112.

Referring again to FIG. 1, the portable device 102 may contain a wireless communication circuit 120, such as a Bluetooth or IrDA interface. If the charger 100 has a corresponding communication circuit 122, the portable device and the charger may interact. In particular, the portable device 102 may communicate that its battery is fully charged and the charger may be turned off to conserve power or prevent overcharging.

Figure 2:
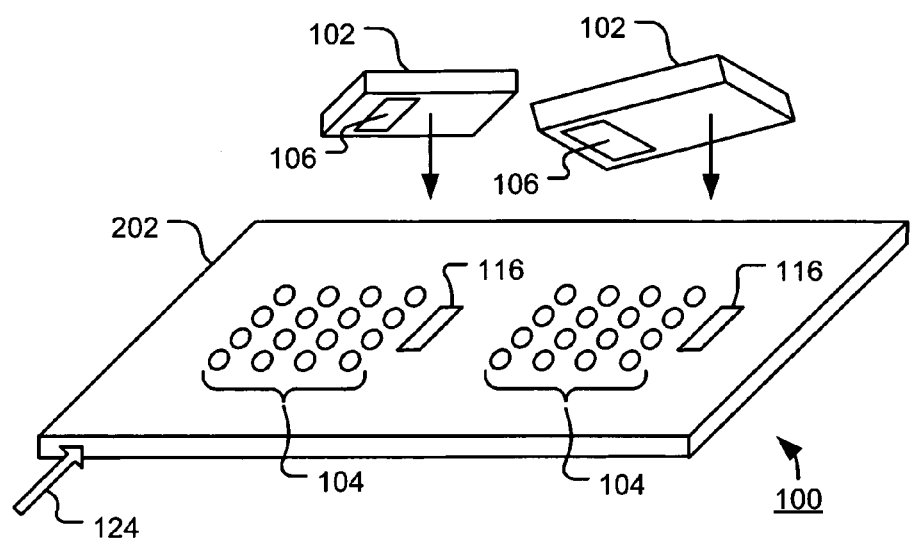
FIG. 2 is a diagrammatic represent of a wireless optical charger consistent with certain embodiments of the invention.

FIG. 2 is a diagrammatic represent of a wireless optical charger 100. In this embodiment, the charger has two charging areas, allowing two portable devices 102 to be charged simultaneously. The charger may have one or more charging areas. Each charging area includes an array of light sources 104, such as high power LED's, and a proximity sensor 116 (such an optical reflectance detector). When a portable device 102 is brought close the surface of the charger, the portable device is detected by a proximity sensor and the corresponding light source is turned on. The portable electronic device 102 is placed with its photovoltaic cell 106 facing the light source 104 so that the photovoltaic cell 106 can receive light from the light source. The light source illuminates the photovoltaic cell 106 of the portable device and charges the battery of the portable device. Power supply 124 may come from a wall power outlet or from some other power source. The LED's 104, proximity sensors 116 and associated circuitry are housed in housing 202. The housing may take the form of a pad for placing on a horizontal surface. In the embodiment shown in FIG. 2, the upper surface of the housing 202 is designed to support the portable device 102. However, other geometric arrangements will be apparent to those of ordinary skill in the art. For example, the array of LED's may be configured in a vertical plane and a portable device placed adjacent to the housing for charging. One proximity sensor may be used for each group of LED's, or each LED may have its own sensor. In one embodiment, a charging LED is used as the emitter for an optical reflectance proximity sensor. The photo-detector of the proximity sensor is shielded from light transmitted on a direct path from the charging LED.

Figure 3:
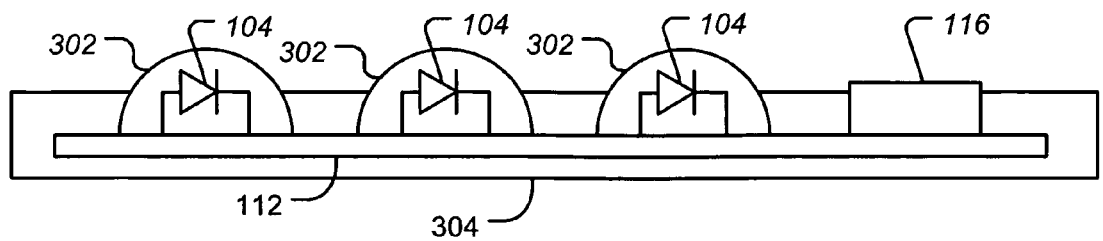
FIG. 3 is cross-sectional view of a wireless optical charger consistent with certain embodiments of the invention.

FIG. 3 is a simplified cross-sectional view of a wireless optical charger consistent with certain embodiments of the invention. Referring to FIG. 3, light emitting diodes (LED's) 104 emit light that passes through emitter lenses 302. Some of this light falls on the photovoltaic cell of the portable device. The LED's 104 are mounted on a circuit board 112. The LED's may be discrete components, or may be formed together in an array. An encapsulating layer or cover 304 protects the circuit board, helps to retain the emitter lenses 302 and provides a surface on which the portable device may be placed. Proximity sensor 116 and associated circuitry are located close to the array of LED's. The charger may be rigid or flexible.

Figure 4:
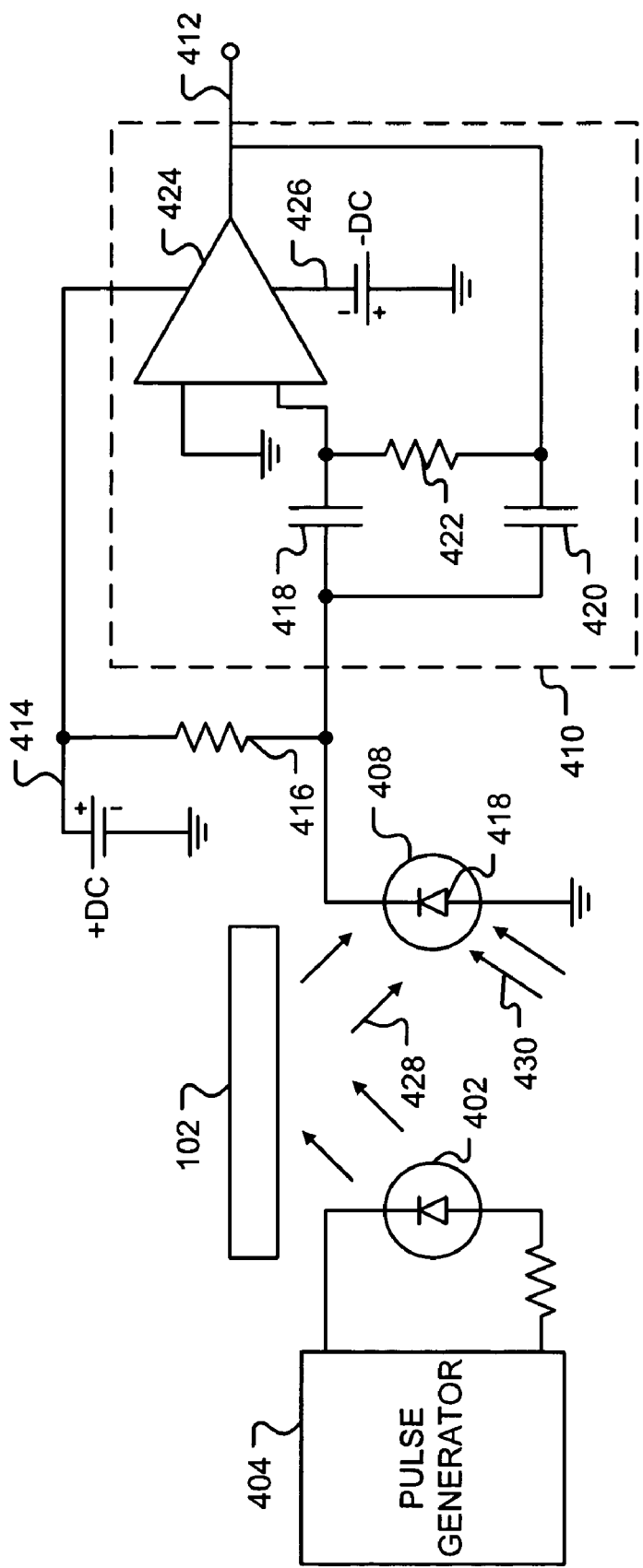
FIG. 4 is a circuit diagram of a proximity sensor circuit of an optical charger consistent with certain embodiments of the invention.

The proximity sensor may be an optical reflectance sensor, such as an HSDL-9100 Miniature Surface-Mount Proximity Sensor manufactured by Agilent Technology, or some other form of detector such as an ultrasonic, pressure, capacitance or inductance detector. When an optical reflectance detector is used, it should be configured to discriminate between reflected light and other light sources, such as the LED's, sunlight, incandescent light and fluorescent light. FIG. 4 is a circuit diagram of a proximity sensor circuit of an optical charger consistent with certain embodiments of the invention. In this embodiment, the light source 402 of the proximity sensor is driven by a modulated drive circuit 404, such as a pulse generator. The modulation frequency is selected to be different from the frequencies of any ambient sources. Light from the light source 402 is reflected from a portable device 406 and received by a photo-detector 408, such as a photodiode or phototransistor. The photo-detector converts the light into an electrical signal that is passed through a filter and amplifier circuit 410 to provide a signal 412 for detection. The photo-detector 408 is reverse biased from D.C. source 414 through biasing resistor 416. This makes the photo-diode function as a voltage source rather than a current source. The capacitors 418 and 420, the resistor 422 and the operational amplifier 424 of the circuit 410 are selected such that the filter has a high-pass or band-pass characteristic. The operational amplifier is powered from D.C. sources 414 and 426. Other filtering circuits will be apparent to those of ordinary skill in the art.

The photo-detector 408 receives reflected light 428 from the portable device and ambient light 430. The ambient light 430 has a D.C. component due to sunlight and A.C. components from light sources such as florescent lights and incandescent lights. In one embodiment of the invention, the light source 402 is amplitude modulated at a frequency in the region of 20 KHz. The A.C. components of the ambient light are typically modulated at much lower frequencies, so the circuit 410 removes most of the signal due to ambient light. The output signal 414 thus contains signal components due mainly to the reflected light 428. The signal 414 can be passed to a threshold detection circuit, for example, and used to control the LED's of the charger.

Figure 5:
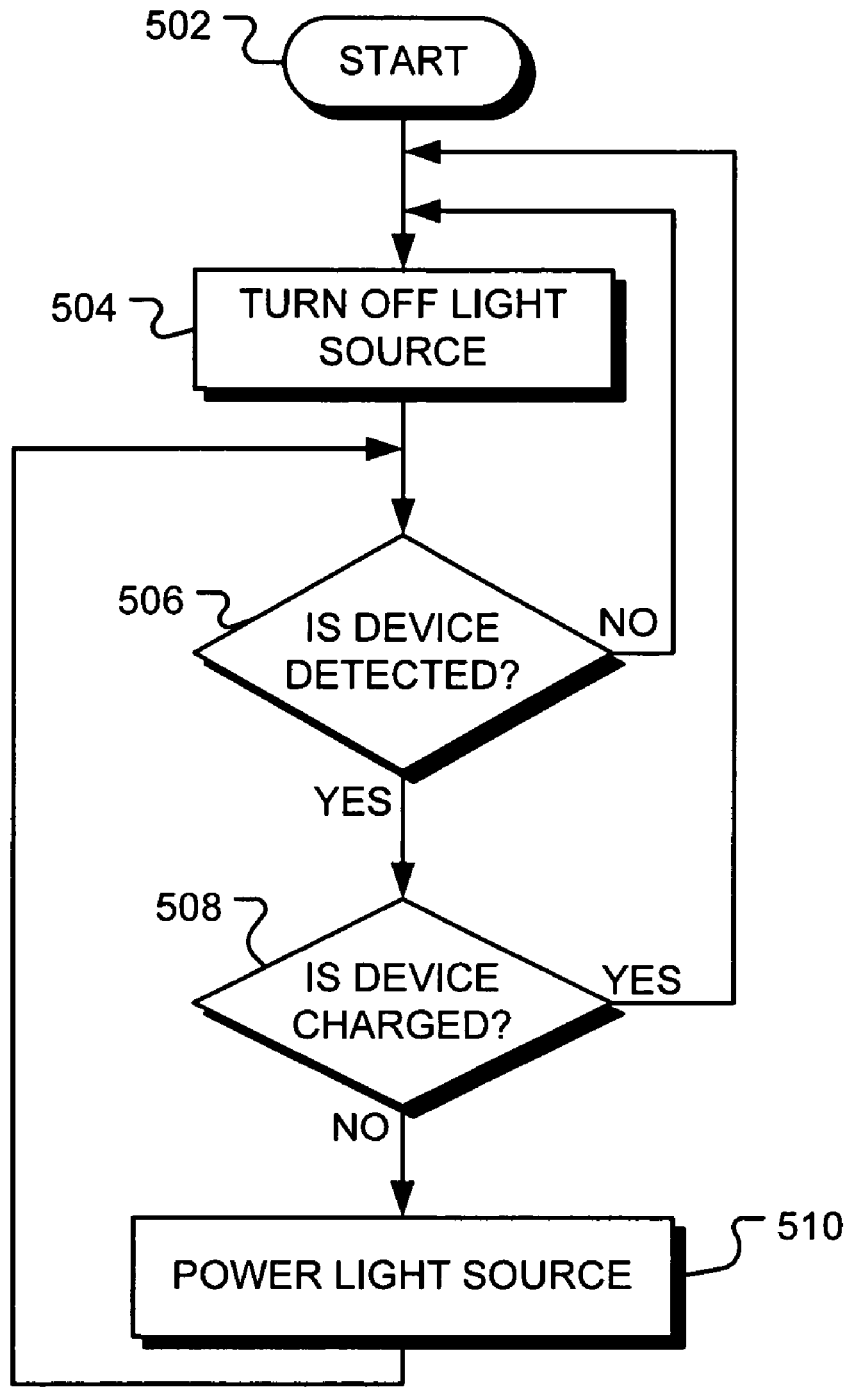
FIG. 5 is a flow chart of a method for charging a portable electronic device consistent with certain embodiments of the invention.

FIG. 5 is a flow chart of a method for charging a portable electronic device consistent with certain embodiments of the invention. Following start block 502 in FIG. 5, the light source of the charger is initially turned off at block 504. This is the default state. At decision block 506, a check is made to determine if a portable electronic device is detected close to the light source of the charger. This check may be made by comparing a proximity sensor signal to a threshold. The result may be polled by the microcontroller or used to generate an interrupt in the microcontroller. If no device is detected, as depicted by the negative branch from decision block 506, flow returns to block 504. If a device is detected, as indicated by the positive branch from decision block 506, flow continues to optional decision block 508. At decision block 508, a check is made to determine if the portable electronic device is fully charged. This check may be determined by communication between the charger and the device using a wireless interface, such as a Bluetooth radio link. If the device is not fully charged, as depicted by the negative branch from decision block 508, or if no check is made, the light source is powered (switched on) at block 510 to start the charging process by illuminating the photovoltaic cell of the portable electronic device. Finally, flow returns to decision block 506. If the device is fully charged, as depicted by the positive branch from decision block 508, flow returns to block 504 and the light source of the charger is switched off to conserve power.

Figure 6:
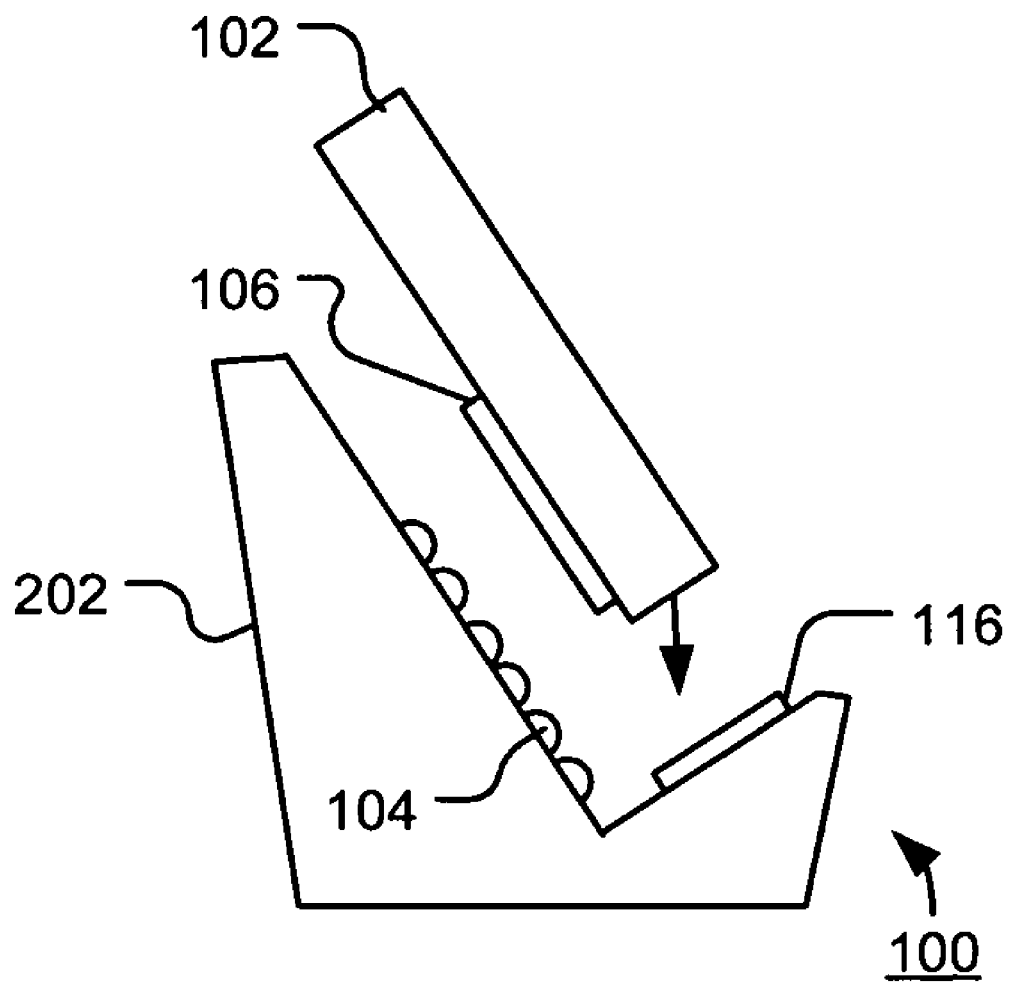
FIG. 6 is cross-sectional view of a wireless optical charger consistent with certain embodiments of the invention.

FIG. 6 is cross-sectional view of a wireless optical charger consistent with certain embodiments of the invention. Referring to FIG. 6, the charger 100 includes a housing 202 that supports an array of light sources 104 and a proximity sensor 116. The proximity sensor is coupled to the light source and is operable to detect when a portable electronic device 102 is close to the light source. When a portable electronic device 102 is close to the light source, the light source is activated to emit light that falls on a photovoltaic cell 106 of the portable device 102. The proximity sensor 116 may be, for example, a pressure switch or an optical reflectance detector.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An optical charger comprising:
    a first light source operable to emit first light; and
    a reflective proximity sensor comparison a light receiver and a detection circuit, the sensor being coupled to the first light source and configured to detect a portable device in proximity to the first light source, the detection circuit comprising a band-pass filter configured to discriminate between: (a) a first light orginating from the light source reflected from the portable electronic device and (b) second ambient light originating from other light sources;
    wherein the first light source is activated to emit first light configured to fall on a photovoltaic cell of the portable device when the portable electronic device is proximity to the first light source;
    //a solar cell operable to receive ambient second light;
    a charge storage device; and
    a charge converter coupled to the solar cell and operable to charge the charge storage device;
    wherein the first light source is powered by the charge storage device.

2. An optical charger in accordance with claim 1, further comprising:
    a light source driving circuit operable to power the first light source; and
    a micro-controller responsive to the proximity sensor and operable to control the light source driving circuit.

3. An optical charger in accordance with claim 1, further comprising:
    a wireless communication circuit operable to communicate with the portable electronic device.

4. An optical charger in accordance with claim 1, wherein the first light source comprises an array of light emitting diodes.

5. An optical charger in accordance with claim 4, wherein a light emitting diode of the array of light emitting diodes is operable to generate first light having wavelengths in the range 700 nm to 1000 nm.

6. An optical charger in accordance with claim 4, wherein a light emitting diode of the array of light emitting diodes is operable to generate infra-red light.

7. An optical charger in accordance with claim 1, wherein the first light source is powered by a power line.

8. An optical charger in accordance with claim 1, wherein the second ambient light originates from sunlight, incandescent light, fluorescent light, or one or more LEDs not operably coupled to the battery charger.

9. An optical charger in accordance with claim 1, wherein the intensity of the first light is modulated in a first frequency band.

10. An optical charger in accordance with claim 1, wherein the the receiver is shielded from light transmitted on a direct path from the first light source.

11. An optical charger in accordance with claim 1, wherein the first light source and the proximity sensor are located on the surface of a pad.

12. An optical charger in accordance with claim 1, wherein the photovoltaic cell is operable to generate an electrical signal in response to the first light received from an optical charger.

13. An optical charger in accordance with claim 12, wherein the photovoltaic cell is responsive to infra-red light.

14. An optical charger in accordance with claim 12, further comprising a charge storage device operably coupled to the photovoltaic cell.

15. An optical charger in accordance with claim 14, further comprising a charging circuit configured to receive the electrical signal from the photovoltaic cell and charge the charge storage device.

16. A method for wirelessly charging a portable electronic device, comprising:
    detecting a presence of the portable electronic device in proximity to a battery charger, the battery charger comprising a first light source;
    emitting first light from the light source in response to detecting the presence of the portable electronic device in proximity to the battery charger, the step of detecting including discriminating, with a detection circuit included in the battery charger, between: (a) the first light originating from the light source and reflected from the portable electronic device, and (b) second ambient light originating from other light sources, wherein discriminating confirms the proximity of the portable electronic device to the battery charger;
    converting the first light originating from the charger into an electrical signal using a photovoltaic cell of the portable electronic device; and
    charging the portable electronic device using the electrical signal.

17. A method in accordance with claim 16, wherein emitting light from the first light source comprises activating at least one light emitting diode corresponding thereto.

18. A method in accordance with claim 16, further comprising deactivating the first light source when the presence of the portable electronic device in proximity to the battery charger is no longer detected.

19. A method in accordance with claim 18, wherein the first light comprises light having wavelengths between about 700 nm and about 1000 nm.

20. A method in accordance with claim 19, wherein the first light emitted by the first light source comprises a modulated light signal.

21. A method in accordance with claim 16, wherein the second ambient light comprises at least one of sunlight, incandescent light, fluorescent light, and light emitted by one or more LEDs not operably coupled to the battery charger.

22. A method in accordance with claim 21, further comprising the portable electronic device signaling the charger to stop charging when the portable electronic device is fully charged.

* * * * *

UNITED STATES PATENT AND TRADEMARK OFFICE
CERTIFICATE OF CORRECTION

PATENT NO. : 7,514,899 B2  
APPLICATION NO. : 11/283304  
DATED : April 7, 2009  
INVENTOR(S) : Deng Peng Chen Page 1 of 1

It is certified that error appears in the above-identified patent and that said Letters Patent is hereby corrected as shown below:

Column 5, Line 43, Claim 1, delete "comparison" and insert --comprising--.

Column 5, Line 46, Claim 1, delete "device" and insert --electronic device--.

Column 5, Line 48, Claim 1, delete "a" and insert --the--.

Column 5, Line 48, Claim 1, delete "orginating" and insert --originating--.

Column 5, Line 49, Claim 1, delete "source" and insert --source and--.

Column 5, Line 54, Claim 1, delete "is" and insert --is in--.

Column 5, Line 56, Claim 1, delete "//a" and insert --a--.

Column 6, Line 26, Claim 10, delete "the the" and insert --the--.

Signed and Sealed this  
Nineteenth Day of March, 2013

Teresa Stanek Rea  
*Acting Director of the United States Patent and Trademark Office*